United States Patent Office 3,813,456
Patented May 28, 1974

3,813,456
PROCESS FOR PREPARING AMINO-SUBSTITUTED PHOSPHONATES
Al F. Kerst, Littleton, Colo., assignor to The Gates Rubber Company, Denver, Colo.
No Drawing. Filed Jan. 17, 1972, Ser. No. 218,513
Int. Cl. C07f 9/40
U.S. Cl. 260—968    5 Claims

ABSTRACT OF THE DISCLOSURE

A process is described for the preparation of amino-substituted phosphonates from their corresponding cyano-substituted phosphonate precursors, the process comprising hydrogenating the cyano-substituted phosphonates in the conjoint presence of ammonia and rhodium catalyst at a temperature from about −20° C. to about 200° C. and at superatmospheric pressure.

The compounds have antibacterial, antifungal and anti-algal activity. They also have utility as phytotoxic materials and impart flame retardancy to certain of their cocondensation products, among other useful applications.

BACKGROUND OF THE INVENTION

This invention relates to a process for the preparation of amino-substituted phosphonates by catalytic reduction of the corresponding cyano-substituted phosphonates with hydrogen.

Various methods have been reported in the literature for the preparation of amino-substituted phosphonic acids or their corresponding phosphonates. In the method of Kosolapoff (JACS, v. 69, 1947, pp. 2112–2113) N-ω-halo-alkylphthalimides are reacted with trialkyl phosphites and the resultant products hydrolyzed to give ω-amino alkane phosphonic acids. The corresponding phosphonates are not easily obtained in good yields from these phosphonic acids. Finklelstein (JACS, v. 68, 1946, pp. 2397–2398) teaches a method of preparing amino-substituted phosphonates comprising preparing an ester from sodiodiethyl phosphite reacted with ethyl β-bromo-propionate, subjecting the ester to ammonolysis, and treating the resultant amide phosphonate with a Hoffman rearrangement reagent to give the desired phosphonate. These phosphonates may also be obtained by the method of Pudovik (C.A. 50:4143). In these prior art syntheses, the resultant phosphonate is oftentimes produced only after a multitude of steps and purifications, use of expensive starting materials, and obtained in overall low yields.

Examples of pertinent prior art references may be found in U.S. Patent Office classification 260, and particularly (though not exclusively) in subclass 583. Examples include U.S. Pat. Nos. 3,117,162 (Rylander et al.), 3,520,932 (Martin et al.), 3,565,957 (Mirviss et al.) and 3,574,754 (Specken), and Freifelder (JACS, v. 82, pp. 2386–2389, 1960).

It is a primary object of the present invention to provide a novel avenue for obtaining amino-substituted phosphonates in good yields, in a direct manner and in which the reaction proceeds substantially without the formation of undesirable gumming side products (e.g. secondary amine polymer formation) or chemical alteration of the phosphonate linkage.

These and other objects are met by the invention.

BRIEF SUMMARY OF THE INVENTION

Briefly described, the invention details a process for the preparation of amino-substituted phosphonates from their corresponding cyano-substituted phosphonates comprising reacting hydrogen with the cyano-substituted phosphonates in the conjoint presence of ammonia and rhodium catalyst at a temperature from about −20° C. to about 200° C.

The compounds of the invention may be used in numerous useful applications, and in particular have anti-bacterial, anti-fungal, and anti-algal activity. Furthermore, the compounds have utility as phytotoxic materials and impart flame retardancy to products formed by cocondensation with amino carboxylic acids of diamine dicarboxylates, for instance. Furthermore, particular compounds made according to the process of the invention are valuable intermediates in the preparation of various sequestering agents, threshold agents, and miconutrients.

PREFERRED EMBODIMENTS OF THE INVENTION (1) Starting materials

The process of the invention may be broadly summarized by the following chemical reaction:

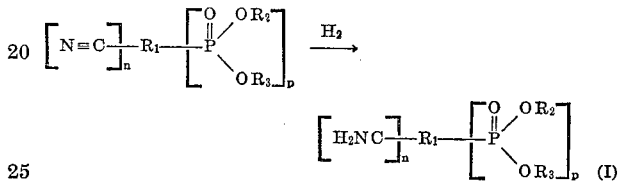

where:

$n$ is an integer preferably selected from 1 to about 4, and more preferably from 1 to 3;

$p$ is an integer preferably selected from 1 to about 3, and more preferably 1 or 2;

$R_1$ is preferably selected from the group comprising alkyl or alkylene of preferably 1 through 12 carbon atoms, substituted alkyl or alkylene of preferably 1 through 10 carbon atoms, aryl or arylene, phenyl or phenylene, substituted phenyl or phenylene, aralkyl or aralkylene of preferably 5 through 10 carbon atoms, substituted aralkyl or aralkylene of preferably 5 through 12 carbon atoms, alkenyl or alkenylene of preferably 3 through 8 carbon atoms, alkynyl of preferably 3 through 8 carbon atoms, cycloalkyl or cycloalkylene of preferably 3 through 12 carbon atoms, substituted cycloalkyl or cycloalkylene of preferably 3 through 12 carbon atoms, cycloalkenyl or cycloalkenylene of preferably 4 through 12 carbon atoms, and substituted cycloalkenyl or cycloalkenylene of 4 through 12 carbon atoms;

$R_2$ and $R_3$ may be the same or different and are preferably selected from the group designated under $R_1$ above, exclusive of aryl substituents whose ring member is attached to a carbon atom α to one of these oxygen atoms. The most preferred starting material of the invention are those in which $R_1$, $R_2$ and $R_3$ are aliphatic of 1 through 12 carbon atoms and where $n$ and $p$ are individually selected from 1 or 2.

A typical group of compounds made according to the invention are represented by the formula:

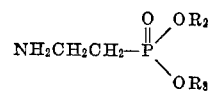

It will be appreciated that if any of the substituents $R_1$, $R_2$, or $R_3$ of the reactant [left side of reaction (I)] contain unsaturated linkages, then the corresponding substituents $R_1$, $R_2$ or $R_3$ of the product [right side of reaction (I)] may increase in saturation, the state of unsaturation or saturation depending in part upon the molar amount of hydrogen supplied during the course of the reaction.

In reaction (I) above, the term "substituted alkyl" is intended to include such radicals as bromoalkyl of 1 through 10 carbon atoms, chloroalkyl of 1 through 10 carbon atoms, hydroxyalkyl of 1 through 8 carbon atoms, alkoxyalkyl of 2 through 8 carbon atoms, alkoxy carbonyl alkyl of 3 through 8 carbon atoms, and cyanoalkyl of 2 through 8 carbon atoms. Other suitable substituents of 1 to 10 carbon atoms include aminoalkyl, nitroalkyl, and isocyanatoalkyl.

Similarly, the terms "aryl" and "substituted phenyl" embrace radicals such as phenyl, furyl, naphthyl, o-biphenyl, pyridyl, chlorophenyl, bromophenyl, alkoxyphenyl, dibromophenyl, fluorophenyl, trichlorophenyl, alkylphenyl of 7 through 11 carbon atoms, dialkylphenyl of 8 through 12 carbon atoms, chloroalkylphenyl of 7 through 10 carbon atoms, nitrochlorophenyl, nitrophenyl, dichloronitrophenyl, chloralkoxyphenyl of 7 through 11 carbon atoms, trifluoromethylphenyl, tetrahydronaphthyl, and indenyl. Additional substituents include cyano, amino, hydroxy, and isocyanato.

The terms "aralkyl" and "substituted aralkyl" are intended to include such radicals as furfuryl, benzyl, phenylalkyl of 8 through 11 carbon atoms, chlorobenzyl, dichlorobenzyl, alkylbenzyl of 8 through 11 carbon atoms, dialkylbenzyl of 9 through 13 carbon atoms, nitrobenzyl, alkoxybenzyl of 8 through 11 carbon atoms, and naphthylamino, cyano, isocyanto, and hydroxy.

The terms "cycloalkyl," "cycloalkenyl," and their substituted derivatives will include cyclohexyl, cyclohexenyl, cyclohexylalkyl, cyclohexenylalkyl, cyclopentyl, cyclopentyl, cyclopentylalkyl, cyclopentenylalkyl, norbornyl, norbornenyl, norbornylalkyl, norbornenylalkyl, bicyclo (2,2,2) octyl, bicyclo (2,2,2) octenyl, bicyclo (2,2,2) octylalkyl, bicyclo (2,2,2) octenylalkyl, cyclopropyl, cyclobutyl, cyclobutylalkyl, cyclobutenyl, cyclobutenylalkyl, hexahydroindanyl, tetrahydroindanyl, hexahydroindenyl, hexahydroindenyl alkyl, tetrahydroindanyl alkyl, hexahydroindanyl alkyl, hexahydro-4,7-methanoindenyl, tetrahydro-4,7 methanoindanyl, hexahydro - 4,7-methanoindanyl, hexahydro-4,7-methanoindenyl alkyl, tetrahydro-4,7-methanoindanyl alkyl, hexahydro-4,7-methanoindanyl alkyl, decahydrophthyl, decahydronaphthyl alkyl, tetrahydronaphthyl, tetrahydronaphthyl alkyl, decahydro-1,4-methanonaphthyl, decahydro-1,4-methanonaphthyl alkyl, octahydro-1,4-methanonaphthyl, octahydro-1,4-methanonaphthyl alkyl, decahydro-1,4,5,8-dimethanonaphthyl, decahydro - 1,4 - 5,8-dimethanonaphthyl alkyl, octahydro - 1,4,5,8 - dimethanonaphthyl, and octahydro-1,4-5,8-dimethanonaphthyl alkyl.

These cyclic substituents can be further substituted with alkyl groups of 1 through 4 carbon atoms, methoxy, chlorine and bromine.

For the sake of brevity, the foregoing listing omits examples of the corresponding compounds of the "ene" type (which are meant to be covered by the invention) in which an additional hydrogen is removed from the molecule. For instance, if a cyano substituent is attached to $R_1$, then $R_1$ would be propylene rather than propyl. Most preferably $R_1$ has substituted thereon a cyano group which is preferably attached to its ω-carbon. An example of such a preferred starting material

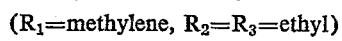

($R_1$=methylene, $R_2$=$R_3$=ethyl)

has the following structural formula:

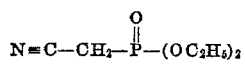

The above compound (diethyl cyanomethylphosphonate) may be synthesized in a conventional manner such as by the reaction of chloroacetonitrile with triethyl phosphite according to the Arbusov method. This same basic reaction may be employed to synthesize a number of cyano-substituted phosphonates as reactants in the present process. It will be further seen that this reaction may be utilized to form polyfunctional reactants in which "$n$" and "$p$" in reaction (I) are individually or collectively greater than one.

The hydrogenation reaction according to the present invention may be conducted in any suitable apparatus such as an autoclave or hydrogenation vessel designed to support a multi-phase system and normally equipped with an inlet for charging hydrogen under pressure. Normally, as little as about 3 moles or more of molecular hydrogen, more preferably as little as about 2.5 moles, and most preferably as little as about 2 moles or more of hydrogen are required per mole of cyano substituent on the phosphonate starting material.

(2) Catalyst

The hydrogenation reaction is conducted in the presence of a rhodium catalyst. This catalyst preferably is able to maintain its mechanical strength under conditions of the reaction, so that it is preferred to employ an inert support or carrier material for the catalyst, e.g., alumina, carbon, barium carbonate, silica, bentonite, and the like. A fixed or fluidized bed may be employed and the catalyst and support material may be admixed in a powdered or pelletized form, for instance. The total catalyst may contain for instance, from about 0.1 to about 12 percent by weight of the catalytic metal.

The catalyst should preferably adsorb and dissociate the molecular hydrogen together with adsorbing and rendering more active the cyano-substituted phosphonate reactant. Customarily employed hydrogenation catalysts such as Raney nickel, cobalt, palladium, and platinum are not suitable for the instant process because they either do not catalyze hydrogenation of the cyano group or they tend to increase deleterious side reactions, e.g., polymerization of intermediate imines.

Preferably from about 1 to about 500 and more preferably from about 5 to about 150 millimoles of rhodium catalyst based on the amount of rhodium metal are required per mole of cyano-substituted phosphonate starting material. This amount will vary, of course, depending on the particular reactant and conditions of hydrogenation.

(3) Reaction media

Hydrogenation over rhodium catalyst is advantageously carried out in the presence of a complexing agent, e.g. ammonia (reported by the above mentioned Freifelder reference), to inhibit formation of deleterious by-products which may be produced by polymerization of reactive intermediates. Ammonia may be supplied to the reaction zone in liquid form or in a solvent, preferably in a polar solvent. Examples of suitable solvents include lower alkyl alcohols such as methanol, ethanol, and isopropyl alcohol. Other solvents are also useful, including benzene, toluene, acetic acid, and hexane. Preferably at least about 1.0 moles, and more preferably from about 3 to about 6 moles of ammonia are present per mole of cyano-substituted phosphonate. When dissolving the ammonia in a suitable solvent, preferably from about 0.02 to about 0.2 liters of solvent are employed per mole of ammonia for suitable dissolution.

(4) Temperature

Generally the hydrogenation reaction may be conducted at relatively low temperatures. Preferably the temperature of reaction is maintained from about —20 to about 200° C., more preferably from about 0 to about 155° C., and most preferably from about 25 to about 100° C.

An extremely high temperature should be avoided since the possibility of deleterious coupling reactions increases at these elevated temperatures. Of course, temperature will be influenced by the particular reactants used and the internal pressure developed in the reactor.

(5) Pressure

The reaction proceeds satisfactorily at pressures slightly above atmospheric pressure. Thus pressure is not narrowly critical and preferably ranges from about atmospheric or slightly lower up to about 1000 p.s.i., and more preferably from about 1 to about 500 p.s.i., with pressures in the range of 3 to about 200 p.s.i. being optimal.

(6) Batch or continuous basis

While the examples described below illustrate the process of the invention on a batch basis, it may, of course, be practiced on a continuous basis with continuous flows of starting materials into the reactor.

(7) Examples

The following examples are set forth for the purpose of illustrating certain embodiments of the invention and are not meant to thereby limit it. Percentages are by weight unless stated otherwise.

EXAMPLE IA

Production of diethyl 2-aminoethyl phosphonate 17.7 g. of diethyl cyanomethyl phosphonate, 150 ml. of 3.72 N ammonia in ethanol solution, and 4 g. of 5 percent rhodium on alumina catalyst are charged to a Parr hydrogenation apparatus. The contents in the apparatus are exposed to an initial hydrogen pressure of 56 p.s.i. and then agitated for about 22 hours, whereupon the pressure drops to 41 p.s.i. Total hydrogen uptake is about 0.425 moles. The reaction mixture is then filtered and the catalyst separated. The filtrate is evaporated to a yellow oil weighing 18.4 g. Spectral analysis indicates this "crude" product to be approximately 90% diethyl 2-aminoethyl phosphonate. Vacuum distillation at 70–90° C. at 2 mm. Hg produces 8.4 g. of product. The temperature required to achieve distillation results in condensation polymerization of diethyl 2-aminoethyl phosphonate. This phenomena accounts for the low recovery upon distillation. Analysis of the distillate by elemental analysis, IR and NMR confirms the presence of the desired amino-substituted phosphonate. No hydrogenolysis products are found.

EXAMPLE IB

Dimethyl 2-aminoethyl phosphonate 14.9 g. of dimethyl cyanomethyl phosphonate, 150 ml. of 3.72 N ammonia in ethanol and 2 g. of 5 percent rhodium on alumina catalyst are charged to a pressure reactor. The mixture is exposed to an initial hydrogen pressure of 59 p.s.i. After 12 hours, 0.21 moles of hydrogen is absorbed. The reaction mixture is filtered and the catalyst residue washed twice with 50 ml. of acetone. The combined filtrate are evaporated to 15.4 g. of a yellow syrup which contains 92% dimethyl 2-aminoethyl phosphonate as indicated by NMR and IR. Distillation at 2 mm. of Hg at 80–100° C. gives 9.4 g. of dimethyl 2-aminoethyl phosphonate. Elemental analysis and NMR confirm the identity of the product.

EXAMPLE IC

Diphenyl 2-aminoethyl phosphonate

Following the procedure of Example IA, 27.3 g. of diphenyl cyanomethyl phosphonate, 150 ml. of 3.72 N ammonia in ethanol solution and 4 g. of 5% rhodium on alumina catalyst are charged to a Parr hydrogenation apparatus. After 18 hours, 0.26 moles of hydrogen are taken up at 62 to 41 p.s.i.

The product is isolated by filtering and evaporating the filtrate to a yellow syrup weighing 27.9 g. This syrup is 93% diphenyl 2-aminoethyl phosphonate as indicated by NMR analysis.

EXAMPLE II

Catalyst recycle

The same starting materials and procedure are employed as in Example IA except that once used catalyst is employed. After the pressure of the reaction has dropped from an initial pressure of 56.2 p.s.i. to 36.7 p.s.i. the reaction mixture is filtered, evaporated to dryness and distilled at 4–5 mm. Hg at about 110°–120° C. to give 10.45 g. distillate or a yield of 57.7 percent of the amino substituted phosphonate.

EXAMPLE III

Hydrogenation of diallyl cyanomethyl phosphonate 20.1 of diallyl cyanomethyl phosphonate, 4.2 g. 5% rhodium on alumina catalyst and 200 ml. of 4.8 N ammonia in ethanol solution are placed in a Parr hydrogenation bottle. The hydrogenation is carried out at between 50–60 p.s.i. over a 48 hour period at which time 0.35 moles of hydrogen are taken up. The contents of the reaction vessel are filtered and the catalyst residue washed three times with 50 ml. portions of acetone. The combined washes and filtrate are evaporated to 18.5 g. of a yellow oil. NMR and IR analysis indicate the product is 86% dipropyl 2-aminoethyl phosphonate and 12% dipropyl cyanomethyl phosphonate with less than 2% secondary amine formation.

EXAMPLE IV

Antifungal activity

The antifungal activity of diethyl 2-aminoethyl phosphonate is established by treating *Fusarium oxysporum, Fusarium roseum, Rhizopus nigricans, Rhizopus stolonifer, Aspergillus niger* and *Alternaria solani* test fungi in the following manner: One loopful of each of the tested viable fungi cultures, spores and mycelia is transferred from an agar slant to an 80 ml. portion of the nutrient broth composed of oatmeal agar, Czapeks, Sabouraud and deionized water to volume. The 80 ml. portion of the fungi and broth is then placed in a sterile shake flask (300 ml.) and the flask is placed on a rotary shaker for 96 to 120 hours at room temperature. At the end of this incubation time period, 10 ml. of the liquid are homogenized and placed in another sterile shake flask (300 ml.) containing 80 ml. of the above nutrient broth and 60 p.p.m. of diethyl 2-aminoethyl phosphonate. The flasks are placed on a rotary shaker operating at 240 r.p.m. at room temperature for 3 to 9 days. After this second incubation time, the flasks are taken off and examined for visible fungal growth and mycelial weights are determined. Untreated controls are used as the basis of comparison and these display profuse fungal growths containing species Fusarium, Aspergillus and Alternaria. The results of these tests indicate that diethyl 2-aminoethyl phosphonate imparts a substantial degree of inhibition to fungal growth at 60 p.p.m.

EXAMPLE V

Antifungal and antiyeast activity

To further define the antifungal activity of this compound the seeded agar plates are prepared by transferring the cultures from slants washed with saline or phosphate buffers to the surface of hardened Sabouraud-Dextrose agar plates. The diethyl 2-aminoethyl phosphonate is tested by impregnating filter paper discs (1.27 cm. in diameter) with 0.08 ml. of the solubilized diethyl 2-aminoethyl phosphonate compounds so as to contain 100 µg./disc and placing them on the surface of the hardened agar. The plates are then incubated at 30° C. for 18 hours. The activity of this compound is established by measuring the zone of inhibition in centimeters. Untreated control plates are used as a basis for comparison and these exhibit a profuse fungal growth. The results of these tests are as follows:

| Microorganism: | Zone of inhibition in centimeters |
|---|---|
| *Aspergillus niger*, ATCC No. 1004 | 3.6 |
| *Alternaria solani*, ATCC No. 6396 | 3.4 |
| *Rhizopus stolonifer*, ATCC No. 10404 | 3.4 |
| *Fusarium oxysporum*, UFCC 1122 | 2.2 |
| *Candida albicans*, SRI 523 | 1.8 |

(8) Modifications

It should be understood that the invention is capable of a variety of modifications and variations which will become apparent to those skilled in the art upon a reading of the specification. Such modifications are intended to be encompassed within the scope of the invention as defined by the appended claims. For instance, while the cyano-substituted phosphonate reactant has been described with respect to certain permissible substituents which may be attached to the molecule, it will be appreciated that other non-reaction-interferring substituents are acceptable and are meant to be included within the sphere of the invention. Further, a mixture of cyano-substituted phosphonates may be employed as the starting material, if desired.

What is claimed is:

1. A process for the preparation of amino-substituted phosphonates from cyano-substituted phosphonates selected from the group consisting of:

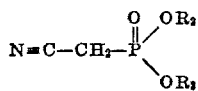

wherein $R_2$ and $R_3$ are independently selected from the group consisting of methyl, ethyl, phenyl and allyl, comprising reacting hydrogen with said cyano-substituted phosphonates in the conjoint presence of a complexing agent in an amount sufficient for polymerization inhibition and a catalytic amount of rhodium at a temperature from about $-20°$ C. to about $200°$ C. at super-atmospheric pressure.

2. The process of claim 1 wherein $R_2$ and $R_3$ are both methyl.
3. The process of claim 1 wherein $R_2$ and $R_3$ are both ethyl.
4. The process of claim 1 wherein $R_2$ and $R_3$ are both phenyl.
5. The process of claim 1 wherein $R_2$ and $R_3$ are both allyl.

References Cited

UNITED STATES PATENTS

| | | | |
|---|---|---|---|
| 3,117,162 | 1/1964 | Rylander et al. | 260—583 K |
| 3,520,932 | 7/1970 | Martin et al. | 260—583 K X |
| 3,565,957 | 2/1971 | Mirviss et al. | 260—583 K |
| 3,574,754 | 4/1971 | Specken | 260—583 K |

OTHER REFERENCES

Freifelder, Journal of the American Chemical Society, vol. 82, pp. 2386–2389 (1960).

LORRAINE A. WEINBERGER, Primary Examiner

R. L. RAYMOND, Assistant Examiner

U.S. Cl. X.R.

260—944